(12) United States Patent
Liu

(10) Patent No.: US 9,575,611 B2
(45) Date of Patent: Feb. 21, 2017

(54) TOUCH PANEL

(71) Applicant: AU Optronics Corporation, Hsin-Chu (TW)

(72) Inventor: Tzu-Wei Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/075,286

(22) Filed: Mar. 21, 2016

(65) Prior Publication Data
US 2016/0202806 A1 Jul. 14, 2016

Related U.S. Application Data

(62) Division of application No. 13/215,275, filed on Aug. 23, 2011, now Pat. No. 9,323,401.

(30) Foreign Application Priority Data

Aug. 24, 2010 (TW) ................. 99128234 A

(51) Int. Cl.
| | | |
|---|---|---|
| *G06F 3/045* | (2006.01) | |
| *G06F 3/041* | (2006.01) | |
| *G06F 3/044* | (2006.01) | |
| *G06F 3/046* | (2006.01) | |
| *G09G 5/00* | (2006.01) | |

(52) U.S. Cl.
CPC ............. *G06F 3/044* (2013.01); *G06F 3/0412* (2013.01)

(58) Field of Classification Search
CPC .......... G06F 3/045; G06F 3/041; G06F 3/044; G06F 3/046; G06F 3/0412
See application file for complete search history.

(56) References Cited

U.S. PATENT DOCUMENTS 8,212,793 B2 * 7/2012 Ishiguro .............. G02F 1/13318
178/18.01
8,441,459 B2 5/2013 Chen et al.
(Continued)

FOREIGN PATENT DOCUMENTS

TW 200836090 9/2008
TW 201013495 4/2010

OTHER PUBLICATIONS

Taiwan Office Action dated May 15, 2013.

*Primary Examiner* — Temesghen Ghebretinsae
*Assistant Examiner* — Paras D Karki
(74) *Attorney, Agent, or Firm* — McClure, Qualey & Rodack, LLP

(57) ABSTRACT

A touch panel is provided. The touch panel includes a pixel array including plural pixels arranged in matrix, plural scan lines electrically coupled to a corresponding pixel line of the pixel array, and at least one touch detection unit arranged corresponding to the pixel array. The touch detection unit includes a first transistor having a first transistor, a second transistor, and a touch detection circuit. The first transistor has a first terminal for receiving a first bias voltage, a second terminal, and a gate. The second transistor has a third terminal electrically coupled to the second terminal, a fourth terminal for receiving a second bias voltage, and a gate. The touch detection circuit includes a first capacitor and a second capacitor and is configured to output a touch signal according to the capacitance value of the first capacitor and the second capacitor when the touch panel is being touched.

7 Claims, 12 Drawing Sheets

(56) References Cited

U.S. PATENT DOCUMENTS

| | | |
|---|---|---|
| 8,665,243 B2 | 3/2014 | Senda et al. |
| 2003/0222659 A1 | 12/2003 | Miyasaka |
| 2007/0040814 A1* | 2/2007 | Lee ..................... G06F 3/0412 |
| | | 345/173 |
| 2008/0054164 A1 | 3/2008 | Johansson |
| 2009/0020686 A1* | 1/2009 | Sano ..................... G06F 3/042 |
| | | 250/208.1 |
| 2009/0174731 A1* | 7/2009 | Kim ........................ G09G 3/20 |
| | | 345/690 |
| 2009/0231313 A1 | 9/2009 | Teranishi et al. |
| 2010/0128004 A1 | 5/2010 | Harada et al. |
| 2011/0199329 A1* | 8/2011 | Kitakado ............ G02F 1/13338 |
| | | 345/174 |
| 2011/0242044 A1 | 10/2011 | Liu |

\* cited by examiner

US 9,575,611 B2

TOUCH PANEL

CROSS-REFERENCE STATEMENT

The present application is a division of U.S. application Ser. No. 13/215,275, filed Aug. 23, 2011, which is based on, and claims priority to, Taiwanese Patent Application Serial Number, 99128234, filed Aug. 24, 2010, the disclosure of which is hereby incorporated by reference herein in its entirety.

BACKGROUND

Touch detection devices have been widely used in various applications such as cell phones, personal digital assistants (PDAs), automatic teller machines (ATMs), liquid crystal displays and so on. Generally speaking, touch detection devices have a controller, a detection circuit with plural touch detection elements, control lines for connecting the controller and the plural touch detection elements and a touch panel. The inventor has recognized that common touch detection devices can be mainly classified into capacitive-type, press-type and photo-type touch detection devices. They are configured to respective output corresponding electrical signal in response to the capacitive variations—pressure variations—and luminance variations.

Refer to FIG. 14 which is a touch detection circuit known by the inventor. The touch detection circuit comprises a reset transistor (RST-TFT), an amplifier transistor (AMP-TFT), a select transistor (SEL-TFT), a reference capacitor (Cref) and liquid crystal capacitor (Clc).

Refer to FIG. 13 which is a photo-type touch detection circuit known by the inventor. The photo-type touch detection circuit comprises a source follower transistor (M1), a reset transistor (M2), a bias transistor (M3), a photo sensor (PD) and a storage capacitor (Cst).

However, the inventor has recognized that the touch detection circuits of FIG. 13 and FIG. 14 may not work well when detected signals are too weak, and thus the sensitivities of the touch detection circuits are not satisfactory.

DETAILED DESCRIPTION

Figure 1:
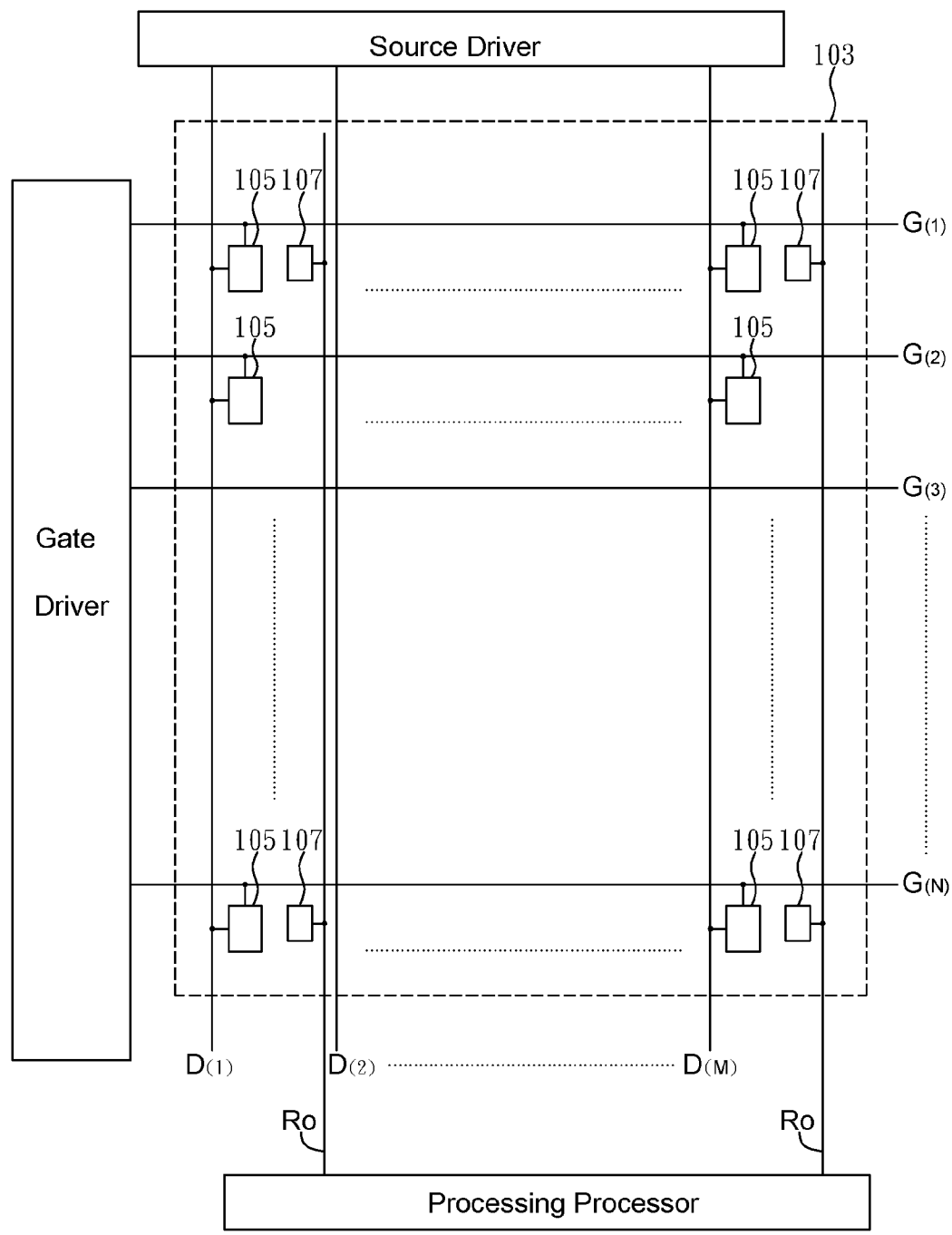
FIG. 1 is a schematic view of a touch panel according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Refer to FIG. 1, which is a schematic view of a touch panel according to one embodiment. The touch panel 100 comprises a pixel array 103, at least one touch detection unit 107, plural scan lines G(1)~G(N), plural data lines D(1)~D (M), and plural read out lines RO. The pixel array 103 comprises a plurality of pixels 105, wherein the plurality of pixels 105 are arranged in matrix. Each of the plurality of scan lines electrically connected to a corresponding row of the pixel array 103. The at least one touch detection unit 107 is disposed corresponding to the pixel array 103.

Figure 2:
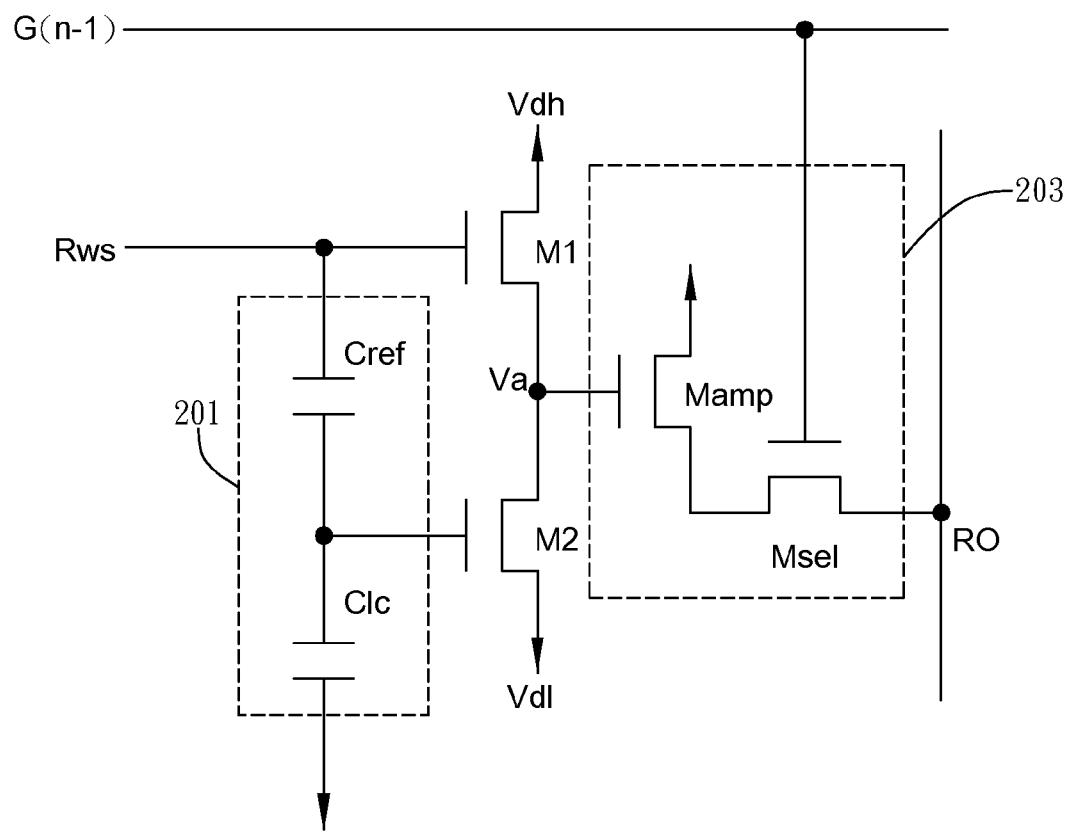
FIG. 2 is a schematic view of a touch detection unit according to one embodiment.

Refer to FIG. 2, which is a schematic view of a touch detection unit according to one embodiment. The touch detection unit 107 comprises a first transistor M1, a second transistor M2, a touch detection circuit 201, and an output circuit 203. The first transistor M1 includes a first terminal, a second terminal, and a gate terminal. The first terminal is for receiving a first bias voltage Vdh, wherein the first bias voltage comprises a fix voltage, a periodic voltage, or a non-periodic signal. The second transistor M2 includes a third terminal, a fourth terminal, and a gate. The third terminal is electrically connected to the second terminal. The fourth terminal is for receiving a second voltage Vdl, wherein the second voltage Vdl comprises a fix voltage, a periodic voltage, or a non-periodic signal. The touch detection circuit 201 is electrically connected to the gate of the first transistor M1 and the gate of the second transistor M2, wherein the touch detection circuit 201 comprises a first capacitor Cref and a second capacitor Clc that are connected in series. According to one embodiment, the first end and the second end of the first capacitor Cref are respectively coupled to the gate of the first transistor and the gate of the second transistor. The first capacitor Cref has a fix capacitance; the second capacitor Clc is a liquid crystal capacitor. When the touch panel is being touched, the capacitance of the liquid crystal capacitor will change. Then the touch detection circuit 201 will generate a touch signal in response to the capacitance of the first capacitor Cref and the second capacitor Clc, and then the output circuit 203 generates a judging signal and transmits the judging signal to the readout line RO. Finally, the readout line RO transmits the judging signal to the processing unit for determining if the touch panel is being touched. According to the embodiment, the output circuit 203 comprises an amplifier transistor Mamp and a select transistor Msel, but it is not limited thereto, in accordance with other embodiments, the output circuit 203 can only have select transitor Msel.

Figure 3:
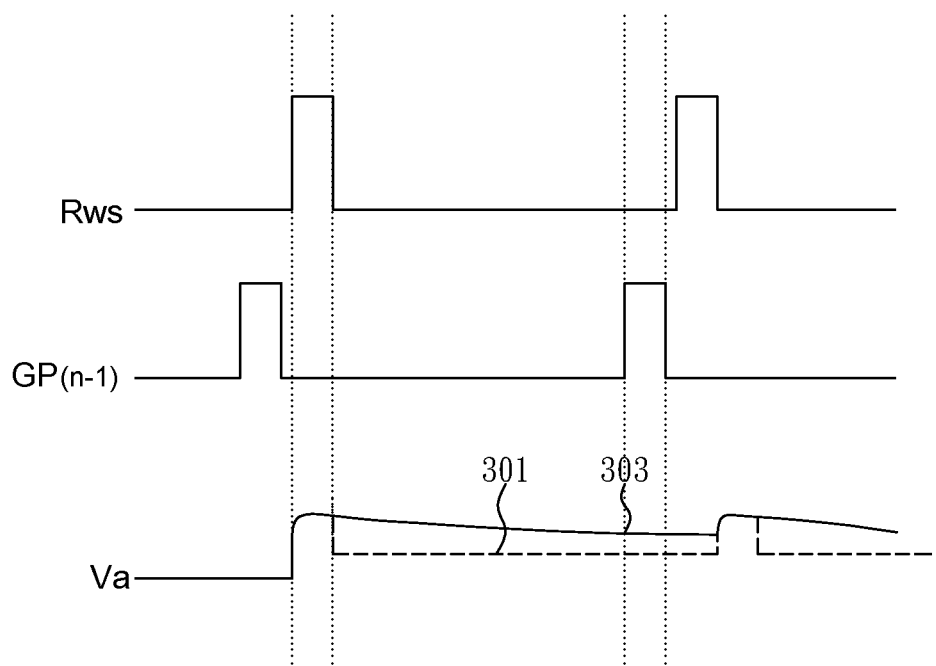
FIG. 3 is a schematic view of a driving waveform of a touch panel according to one embodiment.

Refer to FIG. 2 and FIG. 3 which is a schematic view of driving waveform of the touch panel according to the first embodiment of the present invention. Rws is a periodic signal being supplied to the touch detection circuit 201 from an outer control circuit; Va is the touch signal which is fed to the output circuit 203 in response to the capacitance of the touch detection circuit 201; GP(n–1) is a control signal for controlling the output circuit 203. GP(n–1), for example, could be a gate driving signal (gate pulse) of the (n–1)th scan lines. When the touch panel 100 is being pressed, the capacitance of the second capacitor Clc increases so that Va has a higher voltage level as shown in the waveform 303 of FIG. 3. When the touch panel 100 is not being pressed, Va has a lower voltage level as shown in the waveform 301. As GP(n–1) is at high voltage level, the output circuit 203 outputs a judging signal to the readout line RO according to the touch signal Va, and the processing unit determines if a touch behavior happens according to the judging signal.

Figure 4:
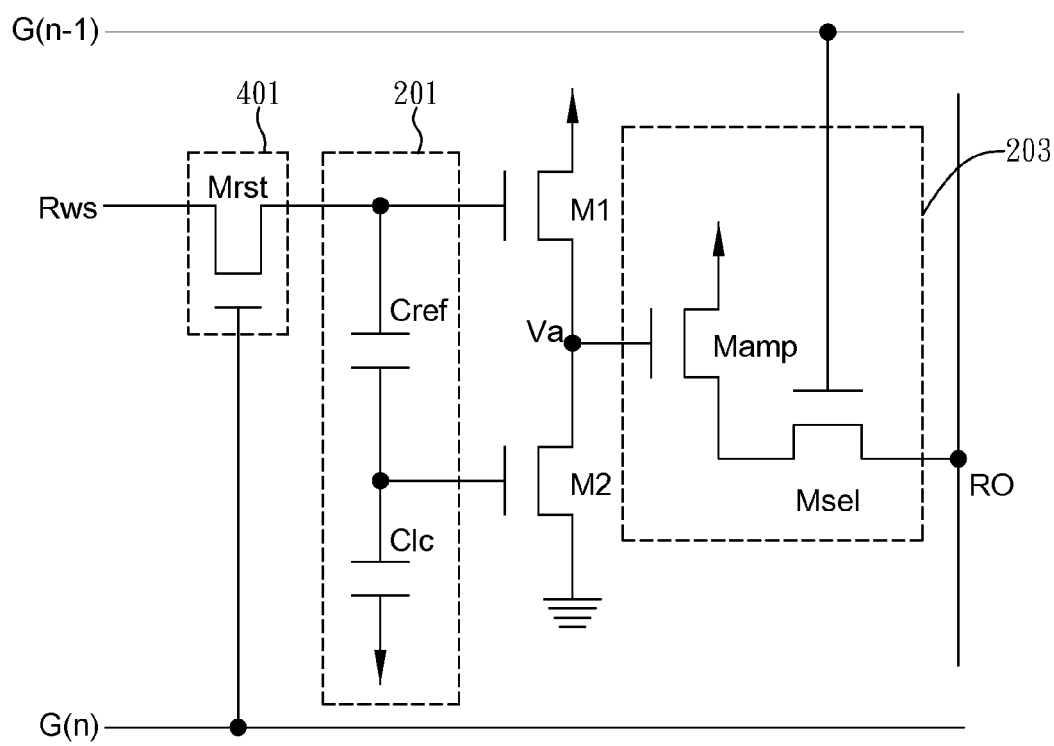
FIG. 4 is a schematic view of a touch detection unit according to one embodiment.
Figure 5:
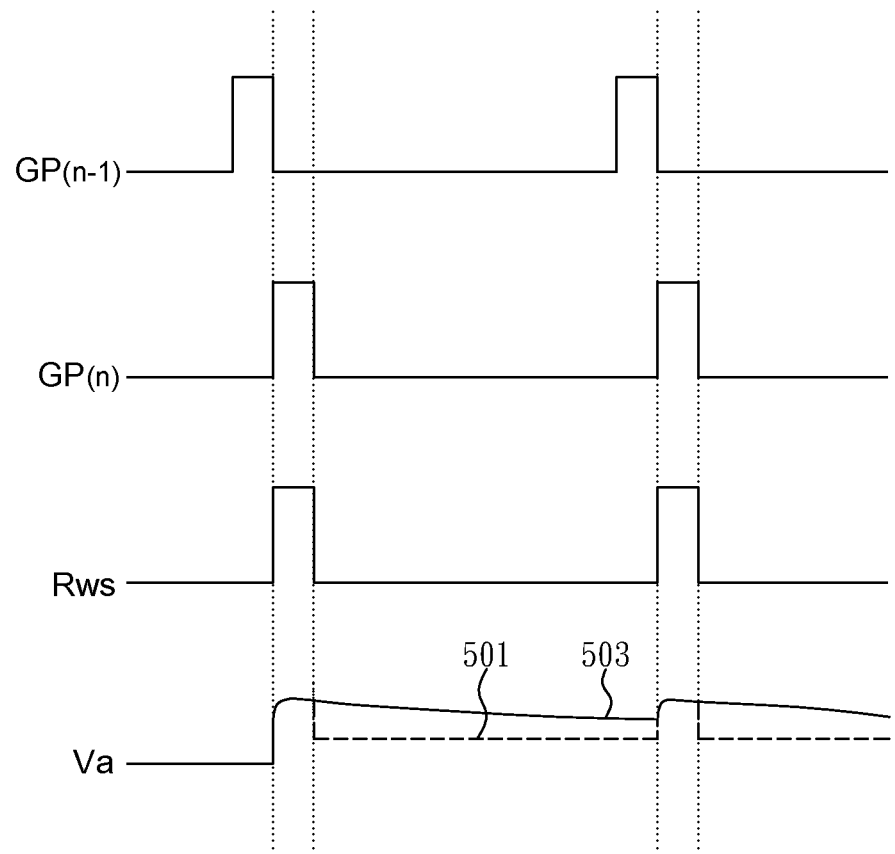
FIG. 5 is a schematic view of a driving waveform of a touch panel according to one embodiment.

Refer to FIG. 4 which is a schematic view of a touch detection unit according to the second embodiment of the present invention. Comparing the detection 407 of the second embodiment with the detection circuit 104 of the first embodiment, the touch detection circuit 407 of the second embodiment further comprises a reset unit 401. According to the second embodiment, an outer circuit transmits a reset voltage to the gate of the first transistor M1 through the reset unit 401, wherein the first reset unit 401 comprises a transistor or a photosensitive transistor. Taking a reset unit 401 comprising a transistor Mrst for example, the transistor Mrst has a first terminal, a second terminal, and a gate terminal. The first terminal is adapted to receive a periodic signal Rws being fed into the touch detection circuit 201 from a outer control circuit; the second terminal is coupled to the touch detection circuit 201; the gate is coupled to nth gate line G(n) and being controlled by GP(n) which is the gate driving signal of nth gate line. When the transistor Mrst is a photosensitive transistor, since the current leakage of a photosensitive transistor is responsive to the light intensity of ambient light, it will beneficial to the application of the touch panel for use in a darker environment. Refer to FIG. 5 which is a driving waveform of the touch panel according to the second embodiment of the present invention. The operation is similar to that of the embodiment and the illustration is omitted.

Figure 6:
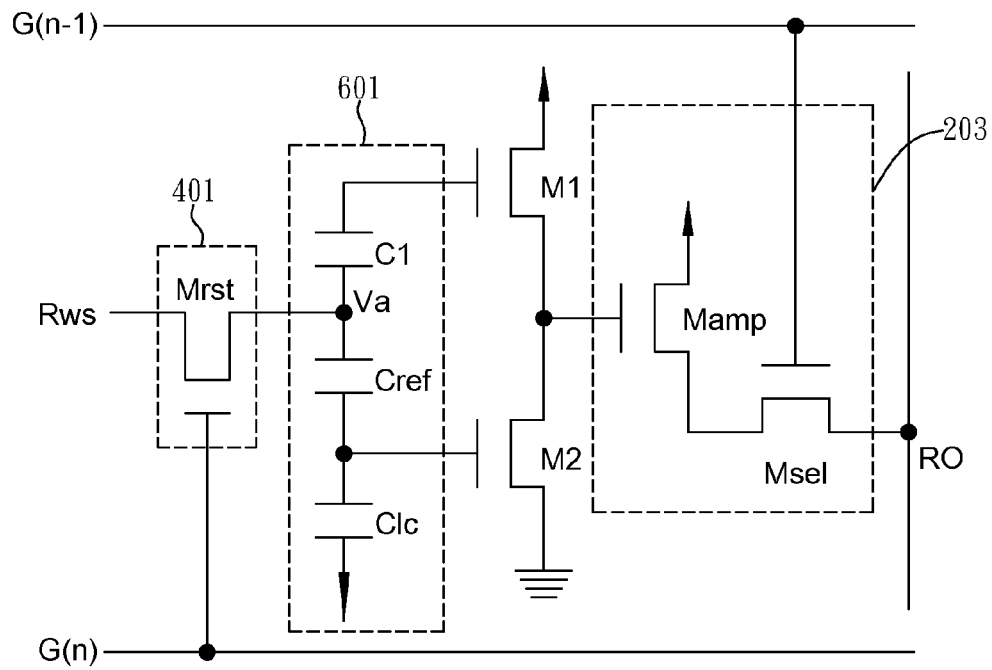
FIG. 6 is a schematic view of a touch detection unit according to one embodiment.

Refer to FIG. 6 which is a schematic view of a touch detection unit according to the third embodiment of the present invention. Comparing the touch detection unit 407 of the second embodiment with the touch detection unit 607 of the third embodiment, the touch detection unit 607 further comprises a third capacitor C1 which is coupled to the first capacitor Cref and the gate of the first transistor M1. The operation point of the reset unit 401 is adjustable by adjusting the capacitance of the third capacitor C1.

Figure 7:
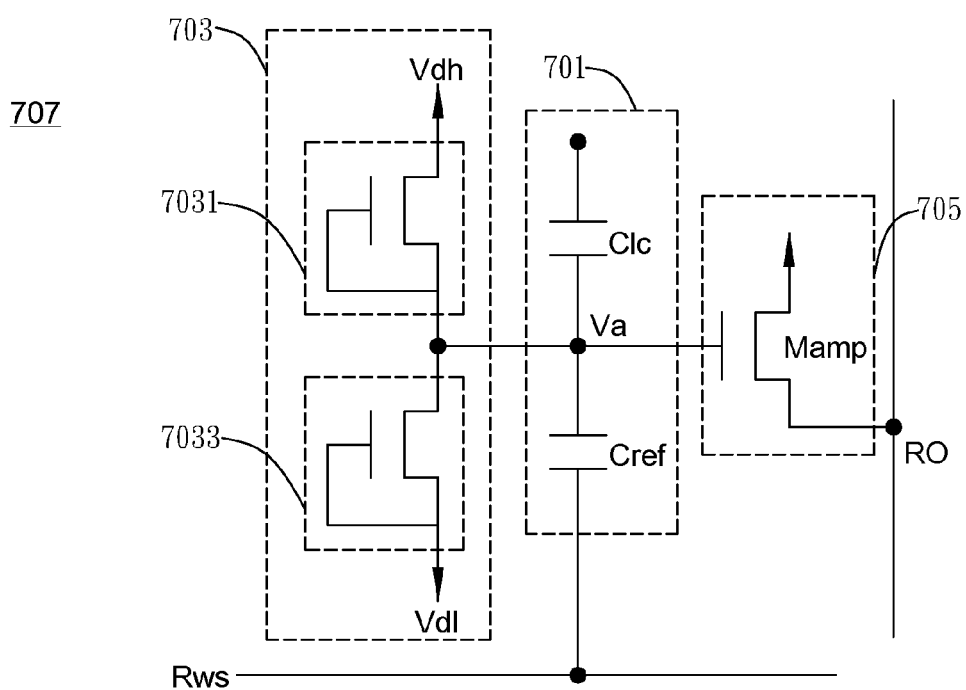
FIG. 7 is a schematic view of a touch detection unit according to one embodiment.

Refer to FIG. 7 which is a schematic view of a touch detection unit according to the fourth embodiment of the present invention. The touch detection unit 707 comprises sensing circuit 703, touch detection circuit 701, and output circuit 705. The sensing circuit 703 comprises a first sensing unit 7031 and a second sensing unit 7033. The first sensing unit has a first terminal and a second terminal. The first terminal is adapted for receiving a first bias voltage Vdh which is, for example, a fixed voltage, a periodic voltage, or non-periodic voltage. The second sensing unit 7033 has a third terminal and a fourth terminal. The fourth terminal is adapted for receiving a second bias voltage Vdl which is, for example, a fixed voltage, a periodic voltage, or non-periodic voltage. The second terminal of the first sensing unit 7031 is coupled to the third terminal of the second sensing unit 7033. The first sensing unit 7031 could be, for example, a diode, a photo diode, photo triode, or diode-connected transistor; the second sensing unit 7031 could be, for example, a diode, a photo diode, photo triode, or diode-connected transistor. The touch detection circuit 701 comprises a first capacitor Cref and a second capacitor Clc connected in series, the first capacitor Cref has a first terminal and a second terminal, the first terminal is adapted to receive a periodic signal Rws which is fed in from a outer control circuit ; the second capacitor Clc has a third terminal and a fourth terminal, and the second terminal of the first capacitor Cref is coupled to the third capacitor of the second capacitor Clc; the second end of the first sensing unit 7031 and the third terminal of the second sensing unit 7033 are coupled to the second terminal of the first capacitor Cref. The touch detection circuit 701 outputs a sensing signal in response to the capacitances of the first capacitor Cref and the second capacitor Clc when it is being touched. The first capacitor Cref has a fixed reference capacitance. The second capacitor Clc is a liquid crystal capacitance. When the touch panel is being touched, the capacitance of the liquid crystal capacitor Clc changes and the touch detection circuit 705 generates a judging signal in response to the first capacitor Cref and the second capacitor Clc. Then, the readout line RO transmits the judging signal to the processing unit for determining if the touch panel is being touched. According to the embodiment, the output circuit 705 comprises an amplifier transistor Mamp, but it is not limited thereto, in accordance with other embodiments, the output circuit 705 can have amplifier transistor Mamp and select transistor Msel.

Figure 8:
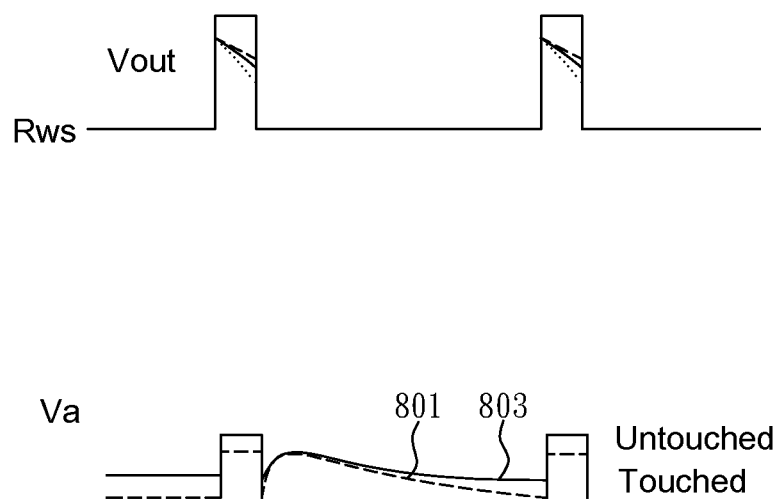
FIG. 8 is a schematic view of a driving waveform of a touch panel according to one embodiment.

Refer to FIG. 7 and FIG. 8. FIG. 8 is a schematic view of the driving waveform of a touch detection unit according to the fourth embodiment of the present invention. Rws is a periodic signal being supplied to the touch detection circuit 701 from an outer control circuit; Va is the touch signal which is fed to the output circuit 705 in response to the capacitance of the touch detection circuit 701. When the touch panel 100 is being touched, the capacitance of the second capacitor Clc increases so that Va has a larger variation. As shown in FIG. 8, when the touch panel is being touched, the variation curve of Va is curve 801; when the touch panel is being untouched, the variation curve of Va is is curve 803. When Rws is at high voltage level, the output circuit 705 outputs a judging signal to the readout line RO in response to the touch signal Va. The processing unit determines if a touch behavior happens according to the judging signal.

Figure 9:
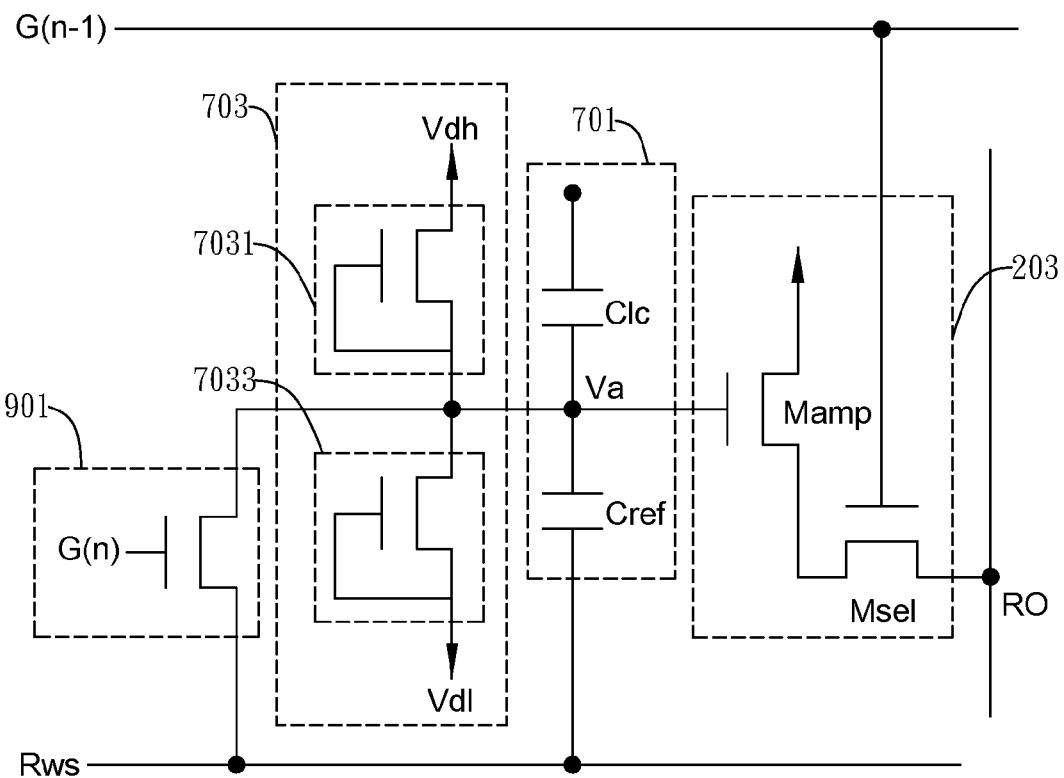
FIG. 9 is a schematic view of a touch detection unit according to one embodiment.
Figure 10:
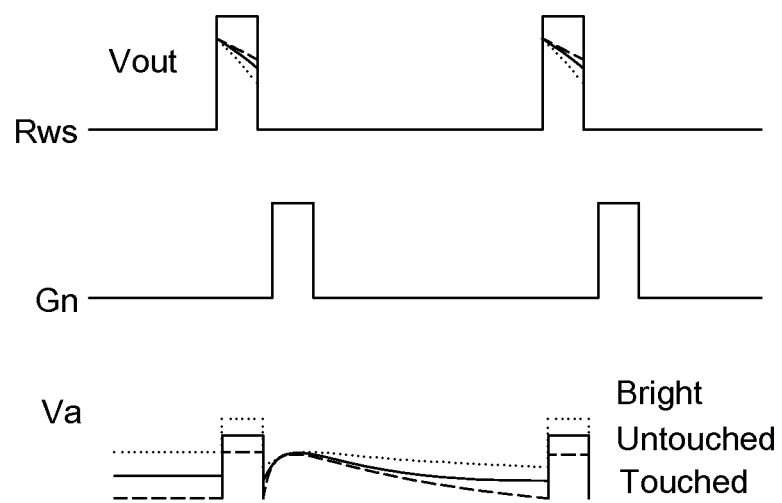
FIG. 10 is a schematic view of a driving waveform of a touch panel according to one embodiment.

Refer to FIG. 9 which is a schematic view of a touch detection unit according to the fourth embodiment of the present invention. Comparing the touch detection unit 907 of the fourth embodiment with the touch detection 407 of the third embodiment, the touch detection unit 907 further comprises a reset unit 901. According to the fourth embodiment, an outer circuit transmits a reset voltage Rws to the second terminal of the first sensing unit 7031, wherein the reset unit 901 is, for example, a transistor or a photosensitive transistor. When the reset unit 901 is a transistor Mrst, the transistor Mrst has a first terminal, a second terminal and a gate terminal. The first terminal is adapted for receiving a periodic signal Rws being fed from an outer control circuit; the second terminal couples to the touch detection unit 701; the gate terminal couples to the nth gate line G(n) and Mrst is controlled by the gate driving signal GP(n). When the transistor Mrst is a photosensitive transistor, since the current leakage of a photosensitive transistor is responsive to the light intensity of ambient light, it will beneficial to the application of the touch panel for use in a darker environment. Refer to FIG. 10 which is a driving waveform of the touch panel according to the fourth embodiment of the present invention. The operation is similar to that of the third embodiment and the illustration is omitted.

Figure 11:
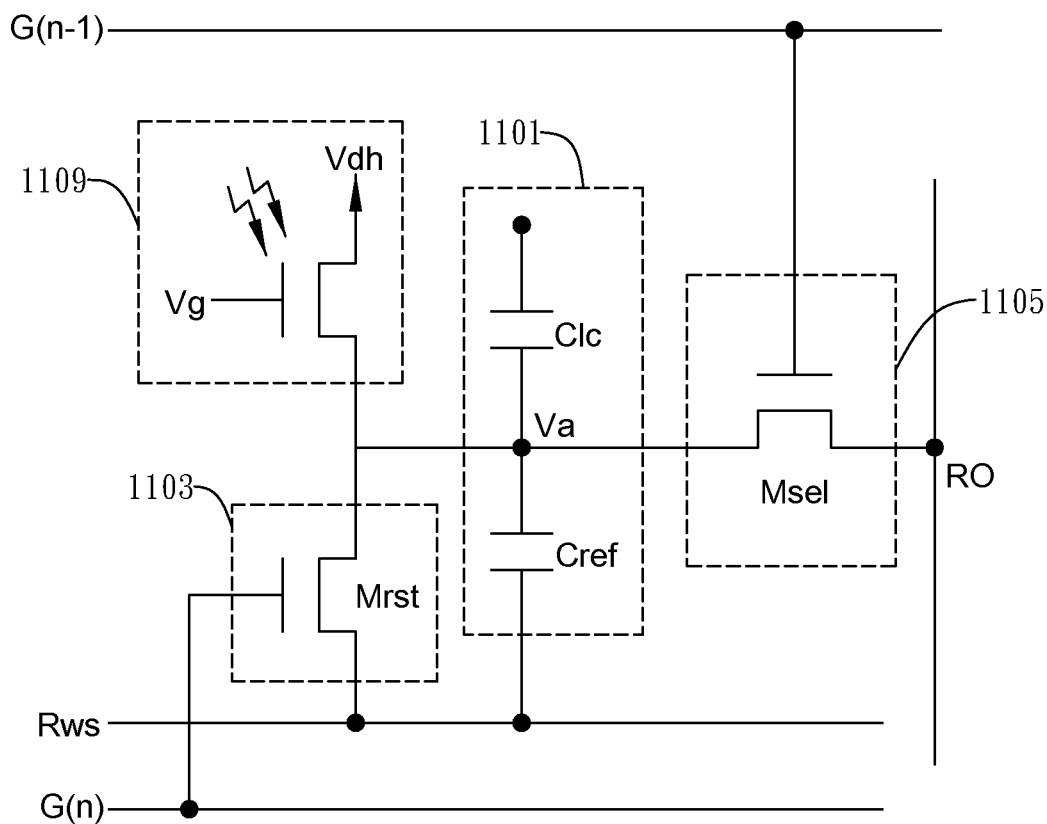
FIG. 11 is a schematic view of a touch detection unit according to one embodiment.

Refer to FIG. 11 which is a schematic view of a touch detection unit of the fifth embodiment according to the present invention. The touch detection unit 1107 comprises a reset unit 1103, a photosensitive unit 1109, a touch detection circuit 1101, and an output circuit 1105. The photosensitive unit, for example, can be a photosensitive transistor. The photosensitive transistor has a first terminal, a second terminal and a gate terminal. The first terminal is for receiving a first bias voltage, wherein the first bias voltage comprises a fix voltage, a periodic voltage, or a non-periodic signal. The gate terminal is adapted receiving a current leakage control voltage Vg to adjust the current leakage of the photosensitive transistor. According to another embodiment, the photosensitive unit 1109 can be a photodiode. The photo diode comprises a first terminal and a second terminal. The first terminal is for receiving a first bias voltage, wherein the first bias voltage comprises a fix voltage, a periodic voltage, or a non-periodic signal. An outer circuit transmits a reset voltage Rws to the second terminal of the first sensing unit 7031 through a reset unit 1103. The reset unit 1103 can be a transistor Mrst. The transistor Mrst has a first terminal, a second terminal, and a gate terminal. The first terminal is adapted to receive a periodic signal Rws being fed into the touch detection circuit 201 from an outer control circuit; the second terminal is coupled to the second terminal of the photosensitive unit 1109; the gate terminal is coupled to the nth gate line G(n). The touch detection circuit 1101 comprises a first capacitor Cref and a second capacitor Clc connected in series. The first capacitor Cref has a first terminal and a second terminal, and the first terminal is adapted for receiving a periodic signal Rws being fed into the touch detection circuit 701 from an outer control circuit. The second capacitor Clc has a third terminal and a fourth terminal, and the third terminal of the second capacitor Clc is coupled to the second terminal of the first capacitor Cref The second terminal of the first capacitor Cref is coupled to the second terminal of the second terminal of the photosensitive unit 1109. The first capacitor Cref has a fixed capacitance, and the second capacitor Clc is, for example, a liquid crystal capacitor. When the touch panel is being touched, the capacitance of the liquid crystal capacitor Clc changes and the touch detection circuit 1101 generates a touch signal in response to the first capacitor Cref and the second capacitor Clc. Then the output circuit generates a judging signal in response to the touch signal and transmits the judging signal to the readout line RO. The readout line RO transmits the judging signal to the processing unit to determine if a touch behavior occurs. According to the embodiment, the output circuit 1105 comprises an amplifier transistor Mamp, but it is not limited thereto, in accordance with other embodiments, the output circuit 1105 can have the same circuit configuration of the output circuit 203 of FIG. 2 or the output circuit 705 of FIG. 7.

Figure 12:
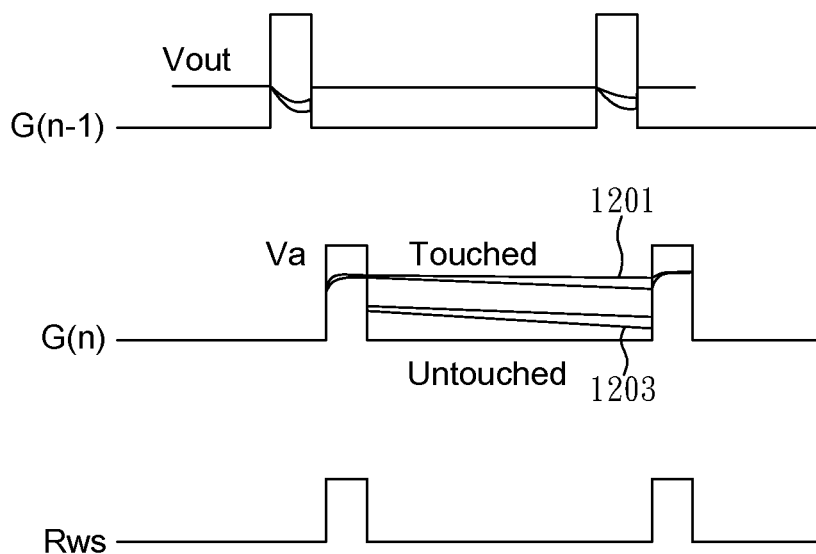
FIG. 12 is a schematic view of a driving waveform of a touch panel according to one embodiment.
Figure 13:
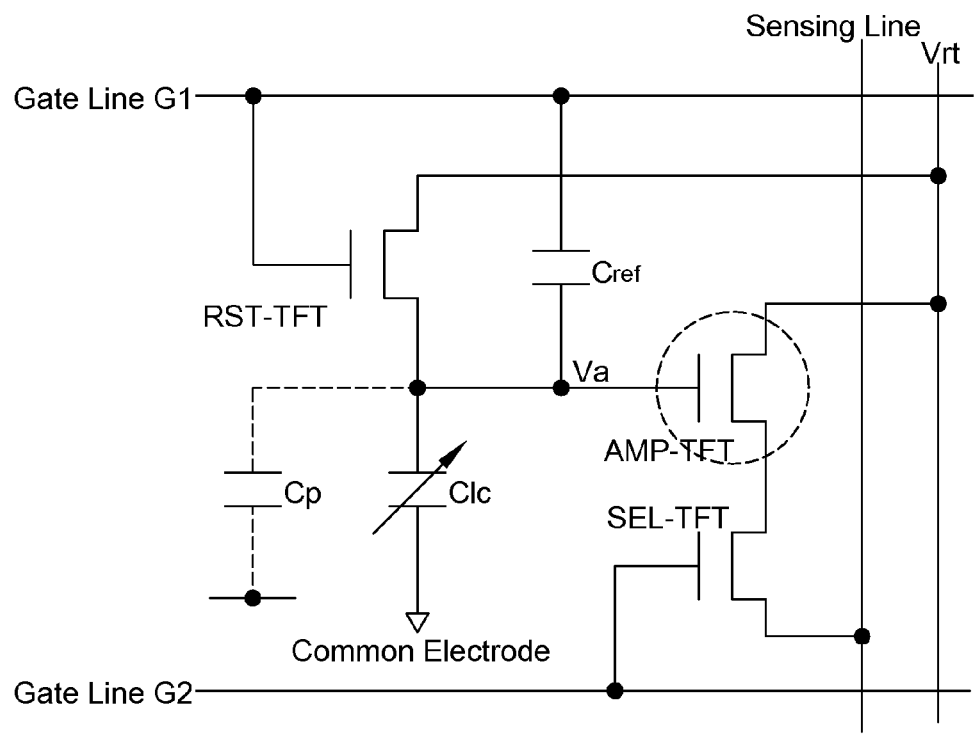
FIG. 13 is a schematic view of a photo-type touch detection unit known by the inventor.
Figure 14:
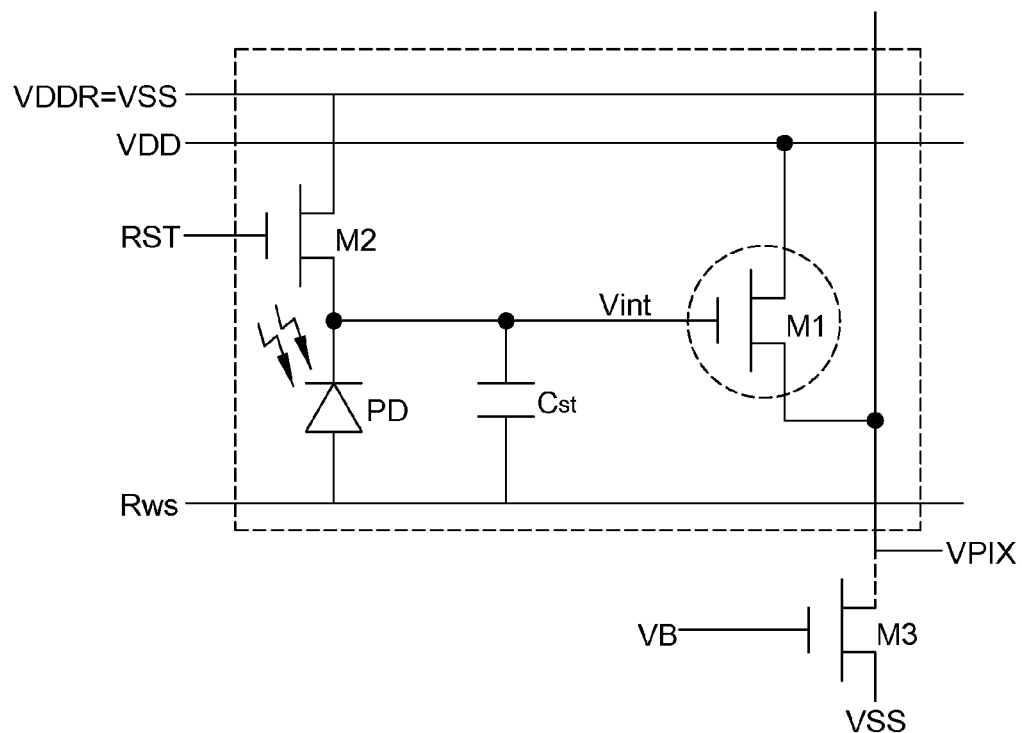
FIG. 14 is a schematic view of a touch detection unit known by the inventor.

Refer to FIG. 11 and FIG. 12 which is a driving waveform of a touch panel according to the fifth embodiment of the present invention. Rws is a periodic signal being fed into the touch detection circuit 701 from an outer control circuit. Va is a touch signal being transmitted from the touch detection circuit 701 to the touch circuit 705. When the touch panel is being touched, the variation curve of Va is curve 1201; when the touch panel is not being touched, the variation curve of Va is is curve 1203. When the gate driving signal GP(n−1) is at high voltage level, the output circuit 705 outputs a judging signal to the readout line RO in response to the touch signal Va. Then the processing unit determines if a touch behavior happens according to the judging signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch panel comprising:
a pixel array including plural pixels arranged in matrix;
plural scan lines, each scan line electrically coupled to a corresponding pixel line of the pixel array; and
at least one touch detection unit arranged corresponding to the pixel array, wherein the touch detection unit comprises:
a sensing circuit comprising a first sensing unit and a second sensing unit, the first sensing unit having a first terminal and a second terminal, the second sensing unit having a third terminal and a fourth terminal, the second terminal of the first sensing unit directly coupled to the third terminal of the second sensing unit; and
a touch detection circuit comprising a first capacitor and a second capacitor connected in series, the first capacitor having a first terminal adapted for receiving a periodic signal and a second terminal, the second capacitor having a third terminal and a fourth terminal, the second terminal of the first capacitor directly coupled to the third terminal of the second capacitor, the second terminal of the first sensing unit and the third terminal of the second sensing unit, wherein the touch detection circuit outputs a touch signal according to the capacitance value of the first capacitor and the second capacitor when the periodic signal is at high voltage level.
2. The touch panel as claimed in claim 1, wherein the touch detection unit further comprises:
an output unit having a transistor with a gate directly coupled to the second terminal of the first capacitor and the third terminal the second capacitor for outputting a judging signal.
3. The touch panel as claimed in claim 2, wherein the touch detection unit further comprises:
a reset unit having a first terminal, a second terminal, and a gate, the first terminal of the reset unit adapted for receiving the periodic signal, the second terminal of the reset unit directly coupled to the second terminal of the first sensing unit and electrically coupled to the second terminal of the first capacitor for transmitting a reset voltage to the gate of the first transistor through the reset unit, the gate of the output unit directly coupled to another one of the plural scan lines.
4. The touch panel as claimed in claim 3, wherein the first sensing unit comprises a photo-sensitive transistor.
5. The touch panel as claimed in claim 4, wherein the reset unit comprises a transistor.
6. The touch panel as claimed in claim 5, wherein the transistor comprises the photo-sensitive transistor.
7. The touch panel as claimed in claim 1, wherein the first sensing unit and the second sensing unit each comprises a diode.

\* \* \* \* \*